(12) United States Patent
Weiss et al.

(10) Patent No.: US 10,920,636 B2
(45) Date of Patent: Feb. 16, 2021

(54) TREATMENT OF COMBUSTION EXHAUST

(71) Applicant: ExxonMobil Research and Engineering Company, Annandale, NJ (US)

(72) Inventors: Brian M. P. Weiss, Bridgewater, NJ (US); Shamel Merchant, Bridgewater, NJ (US); Randall D. Partridge, Califon, NJ (US); Benjamin A. McCool, Annandale, NJ (US); Ajit B. Dandekar, Spring, TX (US); Herbert W. Barry, Yardville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 80 days.

(21) Appl. No.: 16/173,088

(22) Filed: Oct. 29, 2018

(65) Prior Publication Data

US 2019/0136734 A1    May 9, 2019

Related U.S. Application Data

(60) Provisional application No. 62/583,618, filed on Nov. 9, 2017.

(51) Int. Cl.
*F01N 3/20* (2006.01)
*F01N 3/035* (2006.01)

(52) U.S. Cl.
CPC ........... *F01N 3/2066* (2013.01); *F01N 3/206* (2013.01); *B01D 2257/404* (2013.01); *B01D 2258/01* (2013.01); *F01N 3/035* (2013.01); *F01N 2610/03* (2013.01)

(58) Field of Classification Search
CPC . B01D 2258/01; F01N 2610/03; F01N 3/035; F01N 3/206; F01N 3/2066
See application file for complete search history.

(56) References Cited

U.S. PATENT DOCUMENTS

| | | | |
|---|---|---|---|
| 6,485,289 B1 * | 11/2002 | Kelly | ................ F23C 6/02 110/344 |
| 7,803,275 B2 | 9/2010 | Partridge et al. | |
| 8,795,621 B2 | 8/2014 | Dandekar et al. | |
| 8,815,195 B2 | 8/2014 | Dandekar et al. | |

(Continued)

FOREIGN PATENT DOCUMENTS

JP    2014185548 A    10/2014

OTHER PUBLICATIONS

Twigg, "Progress and future challenges in controlling automotive exhaust gas emissions", Applied Catalysis B: Environmental, 2007, 70, 2-15.

(Continued)

*Primary Examiner* — Anthony Ayala Delgado
(74) *Attorney, Agent, or Firm* — Priya G. Prasad

(57) ABSTRACT

Systems and methods are provided for performing selective catalytic reduction on engine exhaust using ethanol from the engine fuel as the reducing agent. Fuel from a fuel tank or other fuel source can be passed through a separation module to produce a fuel stream with a reduced ethanol content and an ethanol-enriched fraction. After combustion of fuel under lean conditions, the combustion exhaust can be exposed to a catalyst system in the presence of the ethanol-enriched fraction.

11 Claims, 3 Drawing Sheets

(56) References Cited

U.S. PATENT DOCUMENTS

| | | |
|---|---|---|
| 8,834,823 B2 | 9/2014 | Dandekar et al. |
| 8,858,907 B2 | 10/2014 | Dandekar et al. |
| 10,005,975 B2 | 6/2018 | Iwashita et al. |
| 2006/0286012 A1 | 12/2006 | Socha et al. |
| 2009/0173061 A1* | 7/2009 | Vitse .................... F01N 3/2066 60/287 |
| 2010/0108605 A1 | 5/2010 | Patil et al. |
| 2010/0155315 A1 | 6/2010 | Partridge et al. |
| 2010/0155322 A1 | 6/2010 | Partridge et al. |
| 2012/0132576 A1 | 5/2012 | Partridge et al. |
| 2012/0132577 A1 | 5/2012 | Partridge et al. |
| 2017/0136420 A1 | 5/2017 | McCool et al. |
| 2017/0137350 A1 | 5/2017 | Weiss et al. |

OTHER PUBLICATIONS

Myadera, "Alumina-supported silver catalysts for the selective reduction of nitric oxide with propene and oxygen-containing organic compounds", Applied Catalysis B: Environmental, 1993, 2, 199-205.

Partridge et al., "On-board separation process", U.S. non-provisional patent application filed by ExxonMobil Research and Engineering Company on Oct. 29, 2018.

* cited by examiner

TREATMENT OF COMBUSTION EXHAUST

CROSS-REFERENCE TO RELATED APPLICATIONS

This application claims priority to U.S. Provisional Application Ser. No. 62/583,618 filed Nov. 9, 2017, which is herein incorporated by reference in its entirety.

FIELD

Systems and methods are provided for treating exhaust from lean combustion of an oxygenate-containing fuel.

BACKGROUND

Conventional internal combustion engine designs can typically include a single fuel for combustion within the engine cylinders. This can require careful selection of an appropriate fuel, so that the fuel has appropriate combustion properties, such as a suitable Research Octane Number or a suitable flame speed. This can limit the selection of fuels, as some compositions that may be suitable from an energy content standpoint can lack appropriate combustion properties.

In addition to selection of a fuel, another consideration can be the method of operating the engine, such as operating the engine to combust the fuel using a stoichiometric amount of fuel versus combustion with a substantial excess of oxygen (i.e., lean combustion). Theoretically, providing a stoichiometric amount of oxygen is sufficient to allow for complete combustion of a fuel. However, from a practical standpoint, attempting to operate with only a stoichiometric amount of oxygen can reduce the amount of combustion that is completed within a time window, such as the time window defined by operation of a cylinder in an internal combustion engine. Operating with an excess of oxygen can improve on the amount of fuel combusted within the engine and/or the speed with which such combustion is achieved. Additionally or alternately, operating an engine with an excess of oxygen can reduce the need to throttle air at low loads, which is beneficial because throttling compromises efficiency. Other technologies that reduce throttling, such as variable valve timing, can be costly and prone to mechanical failure.

Although operating under lean combustion conditions can improve engine efficiency, providing an excess of oxygen can also allow for increased formation of nitrogen oxides ($NO_x$) in the combustion exhaust. Nitrogen oxides are an undesirable component in a combustion exhaust. Therefore, systems and methods that reduce or minimize such nitrogen oxides in a combustion exhaust are desirable.

Japanese patent application publication JP 2014185548 describes methods for performing selective catalytic reduction by allowing unburned hydrocarbons to remain in the exhaust, and using the unburned hydrocarbons as the reducing agent. Additionally, during time periods when the engine temperature is below an activation temperature for effective reduction using the unburned hydrocarbons, ethanol separated from the fuel can be added post-combustion. The injection of ethanol into the exhaust gas is stopped when the engine temperature increases to a temperature above the activation temperature.

SUMMARY

In various aspects, a method for treating a combustion exhaust is provided. The method can include separating a fuel containing ethanol, such as 5 vol % or more of ethanol, into at least an ethanol-enriched fraction and a second fraction. Optionally, the ethanol-enriched fraction can include 40 vol % or more of ethanol. At least one of the fuel and the second fraction can be combusted in a combustion zone under lean combustion conditions. This can result in formation of a combustion exhaust. Optionally, the combustion exhaust can include 50 vppm or more of $NO_x$. At least a portion of the combustion exhaust can be exposed to a catalyst system in the presence of a post-combustion-addition portion of the ethanol-enriched fraction. The combined combustion exhaust and post-combustion-addition portion of the ethanol-enriched fraction can include a ratio of ethanol to $NO_x$ of 1:1 or more. The catalyst system can include a first reducing catalyst. Exposing the combustion exhaust to the first reducing catalyst can form a reduced exhaust fraction. At least a portion of the reduced exhaust fraction can be exposed to a second oxidation catalyst to form a treated exhaust having an $NO_x$ concentration of 50 wppm or less.

Optionally, the method can further include exposing at least a portion of the treated exhaust to a third catalyst corresponding to Pt, Pd, Rh, or a combination thereof on a refractory support. This can form a treated, oxidized exhaust fraction. Optionally, the amount of Pt, Pd, Rh, or a combination thereof can correspond to 0.1 wt % to 5.0 wt % relative to a weight of the catalyst.

Optionally, the method can further include exposing at least a portion of the combustion exhaust to the first reducing catalyst at a temperature below a threshold temperature, wherein the exposing in the presence of a post-combustion-addition portion of the ethanol-enriched fraction is started when the first reducing catalyst is at a temperature greater than the threshold temperature. The threshold temperature can be, for example, at least 100° C.

In some aspects, separating the fuel can correspond to separating the fuel in the presence of a porous carbon membrane under osmosis conditions, such as an asymmetric porous carbon membrane structure. This can form a retentate comprising the second fraction and a permeate comprising the ethanol-enriched fraction.

In various aspects, a system for treating a combustion exhaust is provided. The system can include a fuel pump comprising a fuel pump intake and a pump outlet. The system can further include a membrane separator comprising a porous carbon membrane, a separator inlet in fluid communication with the pump outlet, a separator retentate outlet, and a separator permeate outlet. In some aspects, the membrane separator can correspond to a reverse osmosis membrane separator, such as a membrane separator based on an asymmetric porous carbon membrane structure. In other aspects, the membrane can function based on pervaporation. The system can further include an engine comprising one or more combustion zones in fluid communication with the at least one of the separator retentate outlet and the pump outlet, the engine further comprising a combustion exhaust outlet. The system can further include a catalyst bed comprising a first reducing catalyst and a second oxidation catalyst. The catalyst bed can be in fluid communication with the combustion exhaust outlet via an exhaust conduit. In some aspects, the first reducing catalyst can correspond to Ag supported on a refractory support. In some aspects, the second oxidation catalyst can correspond to Cu, Fe, or a combination thereof on a zeolitic support, such as a support including an MFI or CHA zeolitic framework structure. The amount of Cu and/or Fe on the zeolitic support can correspond to 1.0 wt % to 15 wt % of the weight of the catalyst.

Optionally, Cu can be deposited on a zeolitic support by ion exchange. Optionally, at least a portion of the catalyst bed can be located in the exhaust conduit. The system can further include an injector in the exhaust conduit. The injector can be in fluid communication with the separator permeate outlet.

In some aspects, the catalyst bed can further include a third catalyst comprising Pt, Pd, Rh, or a combination thereof on a refractory support. The amount of Pt, Pd, Rh, or a combination thereof on the refractory support can correspond to 0.1 wt % to 5.0 wt % of the weight of the catalyst. The third catalyst can be located downstream in the catalyst bed relative to a direction of flow within the catalyst bed during engine operation.

Optionally, the system can further include a holding tank. The injector can be in indirect fluid communication with the separator retentate outlet via the holding tank.

DETAILED DESCRIPTION

Figure 1:
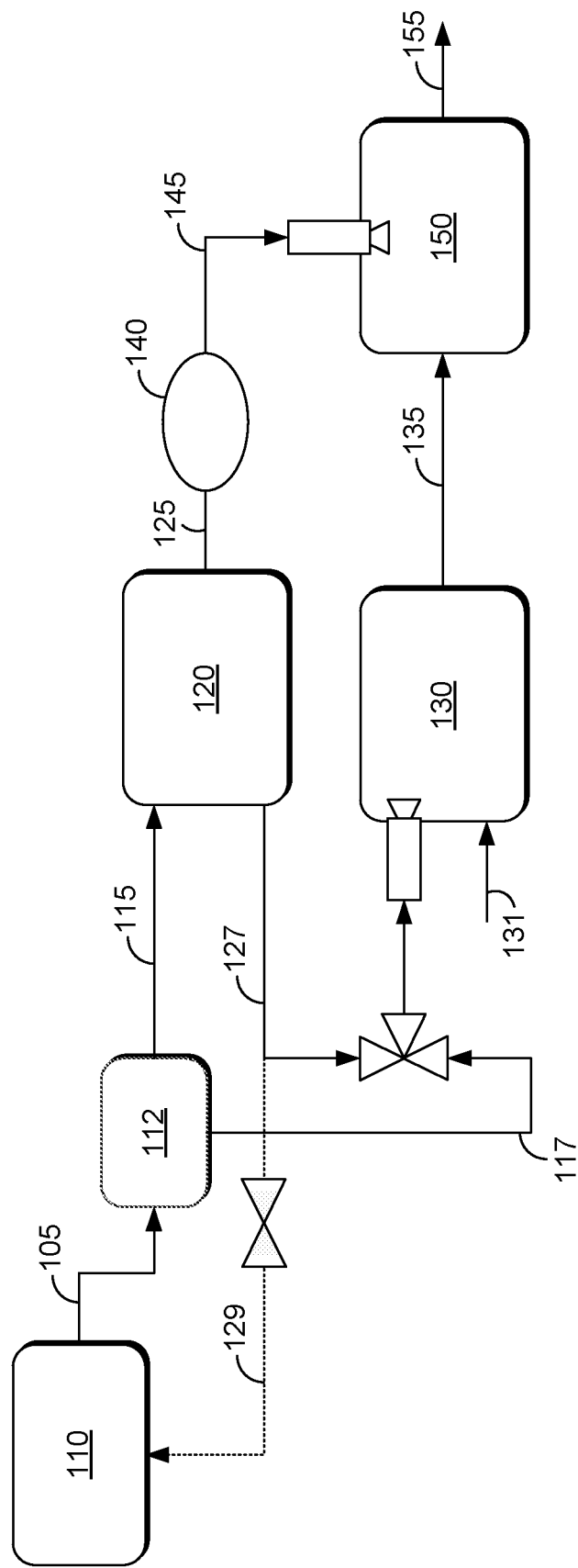
FIG. 1 schematically shows an example of an engine configuration for performing selective catalytic reduction of engine exhaust using ethanol.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing selective catalytic reduction on engine exhaust using ethanol from the engine fuel as the reducing agent. Fuel from a fuel tank or other fuel source can be passed through a separation module to produce a fuel stream with a reduced ethanol content and an ethanol-enriched fraction. The ethanol can optionally be stored in a hold-up tank. The fuel stream with reduced ethanol content can either be returned to the fuel tank or passed on to the engine for combustion. After combustion of fuel under lean conditions (optionally the fuel with reduced ethanol content), the combustion exhaust can be exposed to a catalyst system in the presence of the ethanol-enriched fraction.

In some aspects, the separation module can be based on use of a porous carbon membrane for separation of ethanol from fuel. The porous carbon membrane can be operated under reverse osmosis and/or forward osmosis conditions to perform the separation. This can be beneficial, as the fuel pump typically present in a modern engine can be used to provide pressurized fuel to the porous carbon membrane for the separation under osmosis conditions.

While selective catalytic reduction of nitrogen oxides has been a desirable goal for lean-burn engines based on combustion of gasoline boiling range fuels, one of the difficulties in implementing selective catalytic reduction has been the need to provide a reducing agent. Some conventional methods have involved including a separate source of urea in the engine environment for injection into the combustion exhaust as a reducing agent. While urea is effective as a reducing agent, providing a separate source of urea to the vehicle burdens the vehicle operator with extra cost and inconvenience of maintaining the urea supply.

Many gasoline boiling range fuels now contain 10 vol % or more of ethanol. In addition to being a high octane component, ethanol also has a smaller effective molecular diameter than most typical components in a gasoline boiling range fuel. As a result, ethanol can potentially be separated from a gasoline boiling range fuel, for example, by a separation process that discriminates at least in part based on molecular size while including a reduced or minimized amount of hydrocarbon fuel in the ethanol-enriched fraction. Since the ethanol-enriched fraction from separation will be injected into the combustion exhaust, the energy value of the ethanol-enriched fraction will not be converted into power by the engine. Thus, reducing or minimizing the amount of fuel included with the ethanol during a separation can be beneficial.

In various aspects, the difficulties with providing a separate reducing agent for performing selective catalytic reduction can be overcome by generating the "separate" reducing agent in-situ. An ethanol-containing fuel can be exposed to a membrane under conditions suitable for separation of an ethanol-enriched fraction from a remaining portion of the fuel. Although the yield of the ethanol-enriched fraction may be low, the amount of ethanol needed for selective catalytic reduction in the engine exhaust can be on the order of hundreds of parts per million, or less than 0.1 vol % of the engine exhaust volume. Thus, separating out only a small portion of the ethanol present in a fuel can be sufficient to produce the ethanol-enriched fraction.

In various aspects, the ability to separate ethanol effectively from an ethanol-containing fuel can allow an engine to meet requirements on nitrogen oxide emissions when the engine is operated under "lean" conditions, where an excess of oxygen is present in the combustion environment(s) in the engine. By reducing or minimizing the total amount of fuel used for selective catalytic reduction, the fuel efficiency benefits of lean combustion can be achieved while reducing or minimizing the amount of nitrogen oxides in the combustion exhaust.

As used herein, a lean burn engine is defined as an engine that produces an oxygen-rich exhaust. An oxygen-rich exhaust which is defined as an exhaust having more oxygen than is required to combust a fuel completely to carbon dioxide and water.

Membrane Separation of Ethanol from Fuel

In various aspects, ethanol can be separated from an ethanol-containing fuel in the engine environment. Suitable fuels can correspond to a fuel for a spark ignition engine with an ethanol content of roughly 5 vol % or more, or 10 vol % or more, or 20 vol % or more, or 50 vol % or more, such as up to 85 vol % of ethanol, or possibly still higher. In some aspects, the fuel can correspond to an "E85" gasoline, which generally refers to a fuel having roughly 50 vol % to 85 vol % of ethanol content, with the remaining portion of the fuel corresponding to a naphtha boiling range and/or gasoline boiling range fuel. In some aspects, a suitable fuel can correspond to a naphtha boiling range and/or gasoline boiling range fuel that also includes 5 vol % to 49 vol % of ethanol.

A suitable method for separating ethanol from a fuel can be to perform a membrane separation. The conditions for the membrane separation can vary depending on the nature of the membrane. One example of a suitable membrane can be to use a polymer coated monolith, such as a monolith coated with a membrane based on a polyether-epoxy resin, as described in U.S. Pat. No. 8,765,824, which is incorporated herein by reference for the limited purpose of describing the formation of a polymer coated monolith. Alternatively, a suitable membrane can be formed on a glass plate for initial support, and then separated from the glass plate after cross-linking allows the membrane to have sufficient structural integrity to form a free standing structure. Alternatively, a suitable membrane can be formed by coating polymer solution onto a porous substrate, such as Gore-Tex® or nylon fabric, followed by curing, for fabrication of spiral wound modules.

The optional monolith can correspond to any convenient type of porous substrate with a suitable porosity for serving as a support for a membrane. Suitable types of porous substrates/monoliths can include, but are not limited to, ceramic substrates, polymer substrates, sintered metal substrates, silicone substrates, and carbon fiber substrates. The porous substrate or monolith can have a sufficiently large pore size so that components intended for separation into a permeate can pass through the porous substrate with little or no impedance. Typically the porous substrate can have a pore size distribution that corresponds to larger pore sizes than the pore size distribution of the membrane layer that is supported on the substrate.

Membranes based on polyether-epoxy resins, such as those described in U.S. Pat. No. 8,765,824, can be suitable for separation of ethanol from at least some other components of gasoline. Such membranes can be suitable based on the ability of the membrane to maintain structural integrity in the presence of mixtures of ethanol and various gasoline boiling range compounds. Such membranes can also be suitable based on the ability of the membrane to uptake the desired component for separation into the permeate (ethanol) into the membrane while also being selective for separation of ethanol from at least some typical gasoline components. More generally, other membranes that can provide this combination of features can potentially be suitable.

Polymer membranes can be suitable for separation of ethanol from at least some gasoline boiling range components based on pervaporation. During pervaporation, the membrane can preferentially absorb some components of a fuel mixture, such as ethanol and possibly some aromatics. A reduced pressure (vacuum) environment on the permeate side of the membrane can allow the permeate to vaporize. The permeate can have an increased concentration of ethanol and a substantially reduced concentration of at least some gasoline boiling range components, such as alkanes. Suitable pervaporation temperatures can generally correspond to 0° C. to 300° C. In an engine environment, an inlet temperature to the membrane of 30° C. to 100° C. may be beneficial, so that the inlet temperature to the membrane can correspond to a temperature that allows the engine cooling system to serve as the heat source for the input fuel stream to the membrane. In order to maintain the input feed to the membrane as a mixture of vapor and liquid, the operating pressure on the retentate side of the membrane can range from 0.1 kPag to 1 MPag.

Another type of suitable membrane can correspond to an asymmetric membrane structure having a porous carbon layer as the selective layer. In an asymmetric membrane structure, a first membrane layer can correspond to a selective layer while a second membrane layer can correspond to a porous support layer. Examples of asymmetric membrane structure including a porous carbon layer as a selective layer are described in U.S. Patent Application Publication 2017/0136420, which is incorporated herein by reference for the limited purpose of describing the formation of asymmetric membrane structures that include a porous carbon layer as the selective layer.

The first membrane layer or selective layer can have an amorphous interconnected pore structure that is formed by pyrolysis of the layer, after optional cross-linking. The amorphous interconnected pore structure can allow for selective separation of compounds based on molecular size under conditions suitable for hydrocarbon reverse osmosis. Because passage of permeating species through the selective layer is constrained during a separation, the selective layer can be relatively thin to maintain a desirable transport rate across the membrane. Depending on the aspect the thickness of the selective layer can be about 0.1 µm to about 5 µm.

To provide a sufficient number of pores for transport, the selective layer can have a surface area as measured by nitrogen adsorption (BET) of at least about 100 m$^2$/g, or at least about 200 m$^2$/g, or at least about 300 m$^2$/g, or at least about 500 m$^2$/g, or at least about 600 m$^2$/g, or at least about 700 m$^2$/g of pores having a pore size between 5 Angstroms and 100 Angstroms, or between 5 and 75 Angstroms, or between 5 and 50 Angstroms, or between 5 Angstroms and 35 Angstroms, or between 5 Angstroms and 20 Angstroms. The pores in the selective layer can have any type of pore size distribution, such as a unimodal distribution, a bimodal distribution, or a multi-modal distribution.

Based in part on the interconnected nature of the amorphous pore structure, the transport characteristics of the selective layer can be defined based on the substantial pore size peak in the pore size distribution (such as pore width distribution) corresponding to the smallest median pore size. A substantial pore size peak is defined herein as a peak in a pore size distribution corresponding to at least 5 vol % of the pore volume. The pore size corresponding to a maximum height of a pore size peak in the pore size distribution can be referred to as a median pore size. The width of a pore size peak can be characterized based on the width of a pore size peak at half of the maximum height.

The support layer or second layer of the asymmetric membrane structure can correspond to any convenient type of layer that can provide structural support for the selective layer while having a reduced or minimized impact on transport of components through the membrane. In some aspects the support layer can correspond to a polymer layer with a larger pore size network than the selective layer. In some aspects the support layer can correspond to a porous metal layer.

Examples of polymers suitable for formation of an asymmetric membrane structure (or for formation of at least the selective layer of the asymmetric membrane structure) can include, but are not limited to, polyimide polymers (such as Matrimid® 5218, available from Ciba Specialty Chemicals), polyamide-imide polymers (such as Torlon® polymers available from Solvay Specialty Polymers), polyetherimide polymers (such as Ultem® resins available from SABIC), and partially or fully fluorinated polyethylene and/or polypropylene polymers (or co-polymers), such as polyvinylidene fluoride or polytetrafluoroethylene. More generally, suitable polymers may include glassy polymers, polymers with high intrinsic microporosity, and/or polymers that when are known to form a porous carbon structure when the cross-linked polymer is exposed to pyrolysis conditions.

Still another type of suitable membrane can be a membrane composed of a zeolite and/or based on a zeolitic framework structure. Inorganic membranes are known to have improved heat resistance over polymer membranes and are more resistant to dissolution. An example of a zeolitic framework structure that may be useful is MFI.

Selective Catalytic Reduction of Combustion Exhaust with Ethanol

Ethanol is an example of an oxygenate that is suitable for use as a reducing agent during selective catalytic reduction of nitrogen oxides. The availability of fuels that contain ethanol can allow a single fuel source to be used as both the fuel for combustion and as a source of reducing agent.

During selective catalytic reduction, an engine exhaust or other combustion exhaust can be directed to a unit, zone, conduit, or other location that contains a catalyst system. The combustion exhaust can contain any convenient amount of $NO_x$, such as 50 vppm to 1500 vppm or possibly higher. The catalyst system can correspond to a combination of metal-containing catalysts that yield both high $NO_x$ removing performance and/or other advantageous lean $NO_x$ catalyst performance characteristics.

The catalyst system can include a first catalyst having a first processing temperature range for catalytically processing the gas stream of the exhaust, a second catalyst located downstream from the first catalyst, and optionally but preferably a third catalyst located downstream of the second catalyst. The second catalyst can have a second lower processing temperature range relative to the first temperature range for catalytically processing the gas stream subsequent to the first catalyst. In various aspects, the first catalyst can be adapted to facilitate the reaction of NOx with hydrocarbons to yield $N_2$ and/or nitrogen-containing intermediates such as amines, ammonia, organo-nitrogen species and oxygenates. These intermediate species can desorb into the gas phase along with activated NOx species. The second catalyst can be adapted to facilitate the reaction of these intermediates for further reduction into $N_2$. The second catalyst can also serve in part as an oxidation catalyst by providing activity for oxidation of hydrocarbons remaining in the exhaust. Without being bound by any particular theory, this activity for oxidation can also be beneficial for avoiding formation of carbon monoxide and/or oxidizing carbon monoxide to carbon dioxide. The third catalyst can be adapted to facilitate the oxidation of CO and hydrocarbon emissions from the engine and of hydrocarbons that pass through the fuel separation device along with ethanol. The third catalyst oxidizes these species to $CO_2$ and $H_2O$.

In some aspects, the first catalyst can be composed of a catalytically active metal-containing alumina ($Al_2O_3$) material. For example, the metal-containing alumina can correspond to alumina particles doped with metal and/or that metal is deposited on to by any convenient method. An example of a suitable type of alumina is γ-alumina. In some aspects, the second catalyst can be composed of a catalytically active metal-containing zeolitic material (i.e., a metal supported on a zeolitic material). An example of a suitable zeolitic material is a zeolitic material with an MFI framework structure, such as ZSM-5. Suitable metals can include Cu, Fe, or combinations thereof. The third catalyst can correspond to one or more Group VIII noble metals supported on a refractory support, such as Pt and/or Pd and/or Rh supported on an alumina or silica support. The first, second, and third catalysts can generally be structurally arranged into catalyst beds which may be in the form of powders, pellets, particles, washcoated or formed monoliths such as a honeycomb structure, and the like.

The metal of the first catalyst can be selected from silver, indium, gallium, tin, cobalt, and mixtures thereof. The loading of the metal of the first catalyst can be 1.0 wt % to 15 wt % based on the total weight of the first catalyst, or 2.0 wt % to 5.0 wt %. An example of a suitable first catalyst can be a silver-containing alumina catalyst (Ag/alumina).

In some aspects, the alumina for the first catalyst in the catalyst system can correspond to alumina formed by a sol-gel method. Such an alumina can have beneficial properties for utilization in lean $NO_x$ catalytic treatment of oxygen rich exhaust. For example, the alumina can be synthesized via sol gel methods using a complexing agent in combination with a washing step employing an alcohol, such as, for example, 2-propanol. The sol gel method can be advantageous in that the resulting product is characterized by a basic pH, excellent hydrothermal stability, and optimized metal dispersion on the alumina component to maximize loading capacity and uniformity, thereby enhancing greater reduction of $NO_x$ compared to conventional preparation methods.

In aspects where the second catalyst includes a zeolitic support, the metal of the second catalyst can be selected from copper, iron, cobalt, and mixtures thereof. The loading of the metal of the second catalyst can be 1.0 wt % to 15 wt % based on the total weight of the second catalyst, or 2.0 wt % to 11.5 wt %. The zeolitic component may be selected from any suitable zeolite including, but not limited to, ZSM-5, ZSM-11, ZSM-35, MCM-22, MCM-49, Beta, MCM-56, ITQ-13, chabazite (or other CHA framework type material), dealuminized USY with a silicon to aluminum ratio of greater than about 10, and MCM-68. For example, the second catalyst can be composed of a copper supported on zeolitic support having an MFI framework type, such as ZSM-5 (Cu/zeolite).

In aspects where a third catalyst is used to further reduce the hydrocarbon content of the exhaust, the third catalyst can correspond to Pt, Pd, Rh, or a combination thereof on alumina or another refractory support. In this type of aspect, the loading of metal on the third catalyst can be 0.5 wt % to 10 wt % based on the total weight of the second catalyst, or 1.0 wt % to 5.0 wt %.

In some aspects, the first catalyst can be positioned upstream from the second catalyst in the catalyst system. In other aspects, at least a portion (and up to substantially all) of the first catalyst and the second catalyst can be physically mixed and/or otherwise both exposed to the exhaust at a similar time. In aspects where a third catalyst is present, the second catalyst can be position upstream from the third catalyst. The first and second catalysts can be present in a weight ratio ranging from 1:2 to 2:1, such as a ratio of roughly 1:1. In aspects where a third catalyst is used, the weight ratio can correspond to a weight of the first catalyst to a combined weight of the second catalyst and the third catalyst. The first catalyst in combination with the second catalyst can function to convert and reduce the presence of $NO_x$ in the gas stream of the exhaust.

The exhaust can be injected with a reductant before the exhaust reaches the catalyst system to enhance the catalytic reaction associated with converting $NO_x$ to $N_2$. In various aspects, the reductant or reducing agent can correspond to ethanol separated from the fuel.

In some aspects, the introduction of the ethanol into the exhaust gas stream can be delayed until the catalyst system has reached a desired threshold temperature. Catalysts such as Ag supported on alumina can have a characteristic activation temperature with regard to performing selective catalytic reduction in the presence of ethanol. At relatively low temperatures, such as 150° C. or less or 100° C. or less, the temperature can be too low to allow the catalyst system to effectively catalyze the selective catalytic reduction reactions. As the temperature of the catalyst system increases after engine startup, the catalyst system can become increasingly effective for catalyzing the selective catalytic reduction reactions. In some aspects, the introduction of the ethanol-enriched fraction into the exhaust can be delayed until the catalyst system has reached a temperature of at least 100° C., or at least 150° C.

Configuration Examples

FIG. 1 shows an example of a system configuration for processing engine exhaust to reduce or minimize the amount of NOx in the exhaust. The configuration shown in FIG. 1 is suitable for use with a membrane system that can operate under (reverse) osmosis conditions, such as an asymmetric membrane having a porous carbon layer as the selective layer.

In FIG. 1, a fuel tank 110 can provide ethanol-containing fuel 105 to a fuel pump 112. The fuel pump 112 can correspond to a typical fuel pump for the engine 130 that is performing combustion of the fuel. At least a portion 115 of the pressurized fuel from fuel pump 112 can then be passed into a separation module 120 for separation under reverse osmosis conditions. Another portion 117 of the pressurized fuel can be (optionally) delivered to the engine 130 as would typically be expected. For a separation module 120 that can operate under reverse osmosis conditions, the fuel pump 112 for the engine 130 can also be suitable for delivering fuel at an appropriate pressure for operation of the separation module 120. This can avoid the need for a separate pressurization system to accommodate the separation module. Additionally, the retentate from the separation module 120 can have a pressure similar to the input pressure to the separation module. Thus, the retentate 127 from separation module 120 can be combined with the fuel portion 117 from the fuel pump 112 for input into engine 130. Additionally or alternately, a portion 129 of retentate 127 can be returned to fuel tank 110. Air 131 can also be introduced into the engine 130. Engine 130 can be operated in an expected manner to generate power for a vehicle and to form a combustion exhaust 135.

The permeate 125 from separation module 120 can correspond to an ethanol-enriched fraction. Optionally, the permeate 125 can be stored in a hold-up tank 140 prior to delivery to the catalytic environment for catalyst system 150. The permeate 125 (or optionally flow 145 from the hold-up tank) can provide the reducing agent for performing selective catalytic reduction on exhaust 135 in the presence of catalyst system 150. The permeate 125 (or optionally flow 145 from the hold-up tank) can be injected for combination with exhaust 135 at any convenient location prior to the first catalyst of catalyst system 150. The selective catalytic reduction can allow for formation of a purified exhaust 155 with a reduced or minimized content of NOx.

Figure 2:
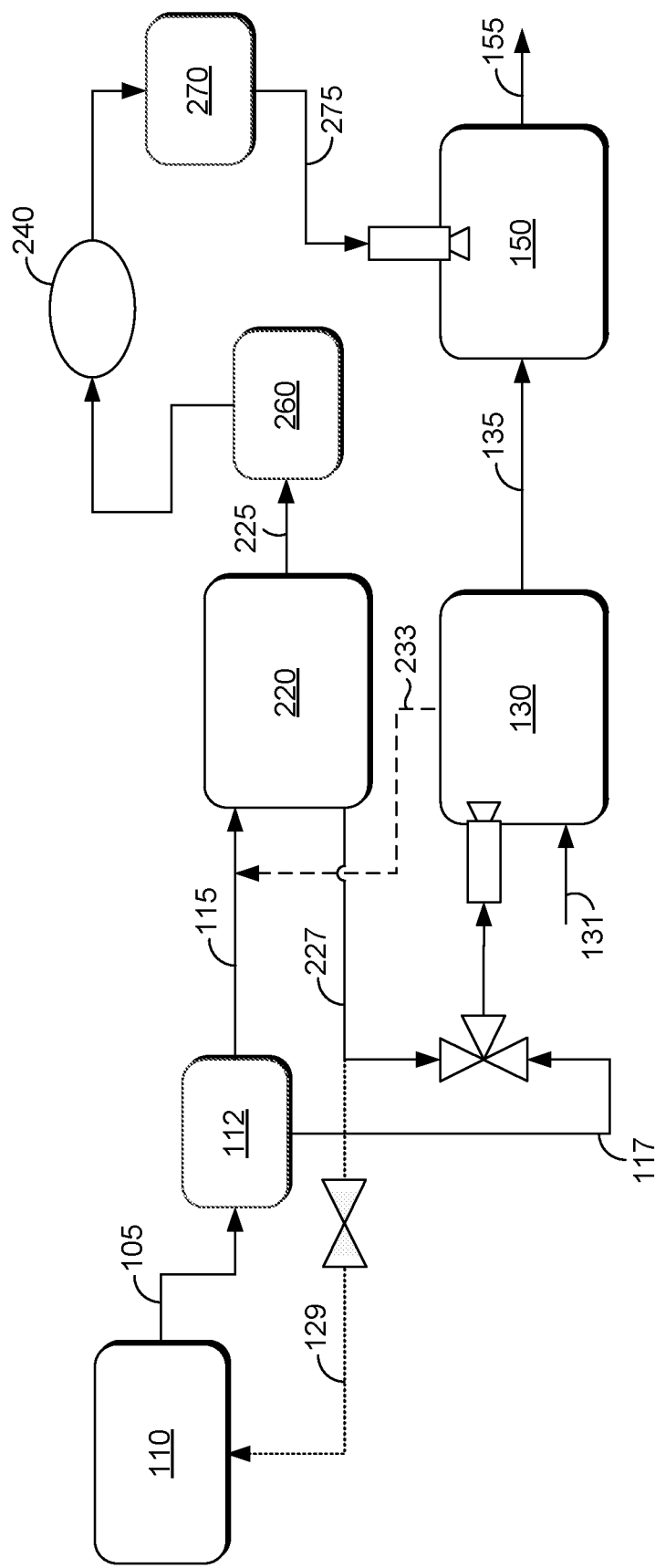
FIG. 2 schematically shows another example of an engine configuration for performing selective catalytic reduction of engine exhaust using ethanol.

FIG. 2 shows another example of a system configuration for processing engine exhaust to reduce or minimize the amount of NOx in the exhaust. The configuration shown in FIG. 2 is suitable for use with a membrane system that can operate under pervaporation conditions.

In FIG. 2, fuel tank 110 can provide ethanol-containing fuel 105 to a fuel pump 112. The fuel pump 112 can correspond to a typical fuel pump for the engine 130 that is performing combustion of the fuel. At least a portion 115 of the pressurized fuel from fuel pump 112 can then be passed into a separation module 120 for separation under pervaporation conditions. The portion 115 for separation can also be heat exchanged 233 (not shown in FIG. 2) with engine coolant to provide the portion 115 at a desirable temperature for separation. Another portion 117 of the pressurized fuel can be (optionally) delivered to the engine 130 as would typically be expected. The retentate 227 from separation module 120 can be combined with the fuel portion 117 from the fuel pump 112 for input into engine 130. Engine 130 can be operated in an expected manner to generate power for a vehicle and to form a combustion exhaust 135.

The permeate 225 from separation module 220 can correspond to an ethanol-enriched fraction. An eductor 260 can be used to assist with removing permeate 225 from the permeate side of membrane 220. After passing through eductor 260, the permeate 225 can be stored in hold-up tank 240. Because separation module 220 operates based on pervaporation, the permeate pressure can be less than 100 kPa-a. As a result, additional pressurization can be needed in order to make further use of the permeate 225. A portion of this re-pressurization can be provided by eductor 260. The volume of the hold-up tank may be allowed to expand against a resistive force, such as a spring-loaded lid, to store permeate at a pressure above 100 kPa-a. Further additional pressurization can be provided by passing fuel from hold-up tank 240 through fuel pump 270 to form a re-pressurized permeate 275 prior to delivery to the catalytic environment for catalyst system 150. The re-pressurized permeate 275 can provide the reducing agent for performing selective catalytic reduction on exhaust 135 in the presence of catalyst system 150. The re-pressurized permeate 275 can be injected for combination with exhaust 135 at any convenient location prior to the first catalyst of catalyst system 150. Optionally, a portion of the repressurized permeate 275 can be used by the eductor 260 to obtain reduced pressure at the membrane. The selective catalytic reduction can allow for formation of a purified exhaust 155 with a reduced or minimized content of NOx.

Separation Example—Pervaporation for Separation of Ethanol from Fuel

An ethanol stable membrane monolith was made by coating a suitable monolith with an epoxy-amine membrane formed using a combination of a) 1,2,7,8-Diepoxy-n-octane (DENO) and b) poly(propylene glycol)-bis(2-aminopropyl ether) with a number average molecular weight of roughly 400 (D400). Additional details regarding formation of this type of membrane can be found, for example, in U.S. Pat. No. 8,765,824. The DENO-D400 membrane monolith was evaluated in a test using with a model feed composed of n-heptane, toluene, and ethanol to evaluate aromatic and ethanol pervaporation separation from aliphatic hydrocarbons. The model feed included 9.2 wt % of ethanol, which was intended to be representative of an "E10" gasoline.

Table 1 shows results from pervaporation of the model feed. The data in Table 1 was obtained after performing the pervaporation separation for roughly 215 hours. The rate of feed flow to the membrane was 1.01 g/sec. The pressure on the retentate side of the membrane was 490 kPa-g. The temperature on the retentate side was 80° C. The corresponding temperature and pressure on the permeate side of the membrane were 70° C. and 15.3 kPa-a, which is substantially less than atmospheric pressure. Under these conditions, the permeate rate was roughly stabilized at 0.28 g/m$^2$-sec, which resulted in a yield of permeate of roughly 3.1 wt % relative to the feed rate. The flux across the membrane was 9.5 g-μm/m$^2$-sec. As shown in Table 1, the permeate composition was 14.5 wt % n-heptane, 39.1 wt % toluene, and 46.4 wt % ethanol. This corresponded to an aromatic selectivity (relative to n-heptane) of 2.9 and an ethanol plus aromatic selectivity of 5.5. The concentration of ethanol in the permeate was roughly five times greater than the concentration of ethanol in the feed

TABLE 1

E10 Model Feed Example for Pervaporation Separation

|  | Feed | Permeate | Retentate |
|---|---|---|---|
| Yield (wt %) | 100.0 | 3.1 | 97.9 |
| Composition (wt %) |  |  |  |
| n-heptane | 46.9 | 14.5 | 45.1 |
| Toluene | 43.8 | 39.1 | 30.6 |
| ethanol | 9.2 | 46.4 | 7.2 |

The results in Table 1 demonstrate that an onboard vehicle pervaporation membrane system can be used to a supply an ethanol-enriched stream for injection into a fuel exhaust to reduce NOx emissions. Operation at 80° C. can allow the use of the engine cooling system to provide the heat necessary for effecting the separation. It is noted that other polymer formulations can potentially provide a still higher ethanol selectivity during the pervaporation separation.

Separation Example—Osmotic Separation of Ethanol from Fuel

In the following example, a single membrane layer formed from a Matrimid® polymer was used to separate ethanol from toluene under reverse osmosis conditions. It is believed that incorporation of a similar porous carbon layer as part of an asymmetric membrane structure would allow for separation of ethanol from toluene at similar selectivity but at higher permeation rates. The conditions below can be considered as reverse osmosis conditions based on the elevated pressure used to cause permeation across the membrane. However, the conditions below can also be similar to forward osmosis conditions based on the use of a sweep stream to remove permeated products from the permeate side of the membrane. It is noted that the pressure driving force for a separation can correspond to osmotic pressure, hydraulic pressure, or both.

Hollow fibers of Matrimid® were extruded as a single layer fiber. The extruded fibers were calcined according to a procedure similar to the procedures described in U.S. Patent Application Publication 2017/0136420 for calcining an asymmetric membrane structure to form a porous carbon layer. The resulting porous carbon hollow fibers were roughly 100 mm long, had a roughly 230 µm outer diameter, an inner diameter of roughly 150 µm, and a wall thickness of roughly 40 µm. A separation module having a shell and tube configurations was made using 14 of the porous carbon hollow fibers.

The separation module was used to perform a separation of a 50 vol %/50 vol % mixture of toluene and ethanol. The mixture of toluene and ethanol was circulated on the outside (shell side) of the fibers at a rate of 4 ml/min at a pressure of 200 barg (20 MPag) and a temperature of about 21° C. After reaching steady state for the flow of the toluene/ethanol mixture, the internal volume (bore or tube side) of the fibers was filled with isooctane at a pressure of about 1 barg (0.1 MPag). The isooctane acted as a draw solution to provide a forward osmosis effect acting in conjunction with the hydraulic pressure differential of 20 MPag between the shell side and bore side of the membrane.

Approximately 24 hours after filling the bore with the isooctane draw solution, samples were withdrawn from the permeate side and the retentate side for analysis. Due to the thickness of the single (selective) layer of the hollow fiber membranes in the separation module (>40 µm), the total amount of permeate transported across the membrane corresponded to less than 0.1 vol % of the feed that was exposed to the separation module. However, the permeate collected during the reverse osmosis separation indicated a significant increase in ethanol concentration relative to toluene in the permeate. It is noted that back diffusion of isooctane draw solution across the membrane in the opposite direction was negligible (~0.0001 vol % isooctane detected in the retentate). The separation factor ratio of ethanol to toluene in the permeate (vol/vol) was 6.9, as determined by $\{(X_{ethanol}/X_{toluene})_{permeate}/(X_{ethanol}/X_{toluene})_{retentate}\}$, where "X" is the volume of the component in either the permeate or the retentate. This corresponded to 87.3 vol % ethanol and 12.7 vol % toluene for the composition of the permeate that traversed the membrane. Although the flux across the membrane was low, the results demonstrate the suitability of the porous carbon layer for separation of ethanol from toluene.

Example—Catalyst Systems for Selective Catalytic Reduction with Ethanol

A model exhaust feed was exposed to a stacked bed of catalysts to determine effectiveness of various catalyst systems for reducing the NOx content during selective catalytic reduction with ethanol as the reducing agent. The model exhaust feed corresponded to 500 vppm of ethanol, 250 vppm of NO, 2 vol % of O2, and 5 vol % of $H_2O$, with the balance of the model feed corresponding to $N_2$.

The feed was exposed to a catalyst system including a top bed and a bottom bed of catalysts. The top bed corresponded to 2 wt % Ag supported on alumina. The bottom bed catalyst corresponded to i) 2 wt % Cu on alumina bound zeolite (ZSM-5); ii) 2 wt % Fe on alumina bound zeolite (zeolite Beta); iii) 2 wt % Ag supported on alumina, which corresponds to the same catalyst as the top bed; iv) 2 wt % Cu supported on zirconia; or v) 14 wt % Ce plus 6 wt % Mn supported on alumina bound zeolite (USY). For bottom bed catalysts i) and ii), the relative volume ratio of the top bed catalyst to the bottom bed catalyst is also indicated. For bottom bed catalysts iii), iv), and v), the volume ratio of top bed catalyst to bottom bed catalyst was roughly 1:1. The model feed was exposed to the catalyst system at a temperature of 300° C. and a gas hourly space velocity of 30,000 $hr^{-1}$.

Figure 3:
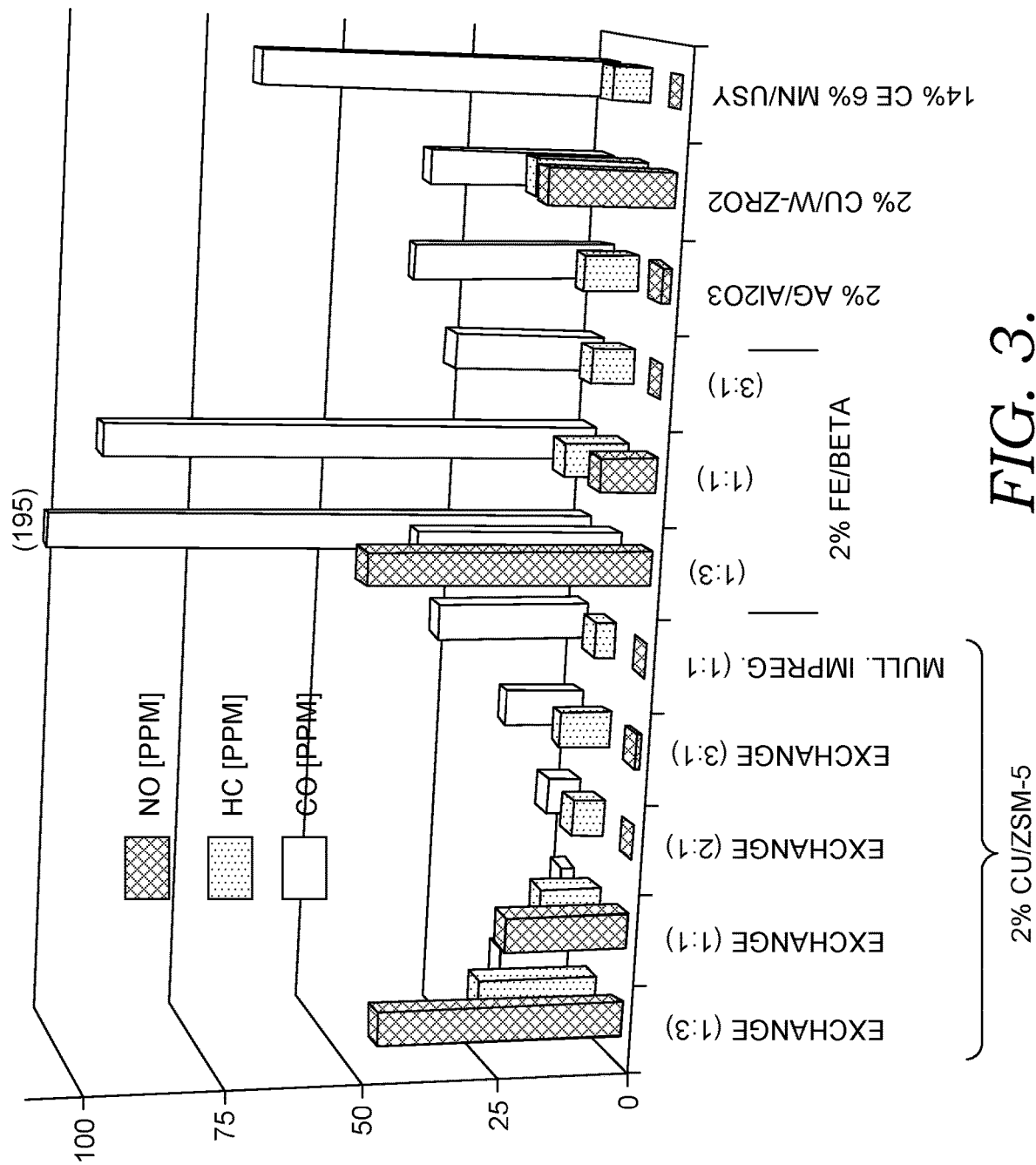
FIG. 3 shows results from performing selective catalytic reduction on a simulated exhaust feed using various catalysts.

FIG. 3 shows results from exposure of the model exhaust feed to the various catalyst systems. In FIG. 3, the front row of results corresponds to the amount of NO (in vppm) remaining in the exhaust. The middle row of results corresponds to the amount of hydrocarbons (in vppm) remaining in the exhaust. The back row corresponds to the amount of carbon monoxide (in vppm) remaining in the exhaust.

As shown in FIG. 3, catalyst systems with a bottom bed catalyst corresponding to 2 wt % Cu on zeolite (ZSM-5) provided the lowest total contaminant slip levels. In addition to reducing the amount of NOx to minimal levels, the 2 wt % Cu on ZSM-5 bottom bed catalyst, when formed by ion exchange to add the Cu, also reduced or minimized the amount of CO and hydrocarbons formed during the selective catalytic reduction. The benefits of using a bottom bed catalyst of Cu on zeolite (ZSM-5) were improved at volume ratios of the top bed catalyst to the bottom bed catalyst of roughly 1:1 or more. This is in contrast to the catalyst systems involving 2 wt % Fe on zeolite or 2 wt % Ag on alumina as the bottom bed, where the NOx level may be reduced but a significant amount of CO was formed during the selective catalytic reduction. It is noted that copper supported on other types of optionally bound zeolites may also be suitable for reducing or minimizing total contaminant slip levels, such as Cu on (optionally bound) chabazite.

Although FIG. 3 is directed to catalyst systems corresponding to two types of catalysts, in some aspects it can be beneficial to include a third catalyst in a catalyst system, such as a third catalyst located downstream from the two catalysts shown in FIG. 3. Such a third catalyst can correspond to, for example, a Group VIII noble metal supported on a refractory support. Suitable noble metals can include Pt, Pd, Rh, or a combination thereof. The third catalyst can be beneficial for further reducing or minimizing the amount of hydrocarbons remaining in the exhaust after exposure of the exhaust to a supported silver catalyst followed by a catalyst include copper supported on zeolite.

Additional Embodiments

Embodiment 1

A method for treating a combustion exhaust, comprising: separating a fuel comprising 5 vol % or more of ethanol into at least an ethanol-enriched fraction and a second fraction, the ethanol-enriched fraction comprising 40 vol % or more of ethanol; combusting at least one of the fuel and the second fraction in a combustion zone under lean combustion conditions to form a combustion exhaust comprising 50 vppm or more of $NO_x$; exposing, in the presence of a post-combustion-addition portion of the ethanol-enriched fraction, at least a portion of the combustion exhaust to a first reducing catalyst to form a reduced exhaust fraction, the combined combustion exhaust and post-combustion-addition portion of the ethanol-enriched fraction comprising a ratio of ethanol to $NO_x$ of 1:1 or more; and exposing at least a portion of the reduced exhaust fraction to a second oxidation catalyst to form a treated exhaust having an $NO_x$ concentration of 50 wppm or less, wherein at least a portion of the first catalyst is optionally located in an exhaust conduit.

Embodiment 2

The method of Embodiment 1, the method further comprising exposing at least a portion of the treated exhaust to a third catalyst comprising Pt, Pd, Rh, or a combination thereof on a refractory support, to form a treated, oxidized exhaust fraction, the third catalyst optionally comprising 0.1 wt % to 5.0 wt % of Pt, Pd, Rh, or a combination thereof relative to a weight of the catalyst.

Embodiment 3

The method of Embodiment 1 or 2, further comprising returning at least a portion of the second fraction to a fuel reservoir comprising the fuel.

Embodiment 4

The method of any of Embodiments 1 to 3, further comprising exposing at least a portion of the combustion exhaust to the first reducing catalyst at a temperature below a threshold temperature, wherein the exposing in the presence of a post-combustion-addition portion of the ethanol-enriched fraction is started when the first reducing catalyst is at a temperature greater than the threshold temperature.

Embodiment 5

The method of Embodiment 4, wherein the threshold temperature is at least 100° C., or at least 150° C.

Embodiment 6

The method of any of Embodiments 1 to 5, wherein separating a fuel comprises separating the fuel in the presence of a porous carbon membrane under osmosis conditions to form a retentate comprising the second fraction and a permeate comprising the ethanol-enriched fraction, the porous carbon membrane optionally comprising an asymmetric membrane structure; or wherein separating a fuel comprises separating the fuel in the presence of a membrane under pervaporation conditions to form a retentate comprising the second fraction and a permeate comprising the ethanol-enriched fraction.

Embodiment 7

The method of any of the above Embodiments, wherein separating a fuel comprises separating the fuel in the presence of a polymeric membrane, a zeolitic membrane, a porous carbon membrane, or a combination thereof.

Embodiment 8

A system for treating a combustion exhaust, comprising: a fuel pump comprising a fuel pump intake and a pump outlet; a reverse osmosis membrane separator comprising a porous carbon membrane, a separator inlet in fluid communication with the pump outlet, a separator retentate outlet, and a separator permeate outlet; an engine comprising one or more combustion zones in fluid communication with the at least one of the separator retentate outlet and the pump outlet, the engine further comprising a combustion exhaust outlet; a catalyst bed comprising a first reducing catalyst and a second oxidation catalyst, the catalyst bed being in fluid communication with the combustion exhaust outlet via an exhaust conduit; and an injector in the exhaust conduit, the injector being in fluid communication with the separator permeate outlet, the porous carbon membrane optionally comprising an asymmetric membrane structure, wherein optionally at least a portion of the catalyst bed is located in the exhaust conduit.

Embodiment 9

The system or method of any of Embodiments 1 to 8, wherein the first reducing catalyst comprises Ag supported on a refractory support; or wherein the second oxidation catalyst comprises Cu, Fe, or a combination thereof, on an oxidation catalyst support, the oxidation catalyst support optionally comprising a zeolitic support; or a combination thereof.

Embodiment 10

A system for treating a combustion exhaust, comprising: a fuel pump comprising a fuel pump intake and a pump outlet; a membrane separator comprising a separator inlet in fluid communication with the pump outlet, a separator retentate outlet, and a separator permeate outlet; an engine comprising one or more combustion zones in fluid communication with the at least one of the separator retentate outlet and the pump outlet, the engine further comprising a combustion exhaust outlet; a catalyst bed comprising a first reducing catalyst comprising Ag on a refractory support and a second oxidation catalyst comprising Cu, Fe, or a combination thereof on a zeolitic support, the catalyst bed being in fluid communication with the combustion exhaust outlet via an exhaust conduit; and an injector in the exhaust conduit, the injector being in fluid communication with the separator permeate outlet, wherein optionally at least a portion of the catalyst bed is located in the exhaust conduit.

Embodiment 11

The system of Embodiment 10, wherein the system further comprises an eductor in fluid communication with the separator permeate outlet of the membrane separator.

Embodiment 12

The system of any of Embodiments 8-11, wherein the catalyst bed further comprises a third catalyst comprising Pt, Pd, Rh, or a combination thereof on a refractory support, the third catalyst optionally comprising 0.1 wt % to 5.0 wt % of Pt, Pd, Rh, or a combination thereof relative to a weight of the catalyst, the third catalyst being located downstream in the catalyst bed relative to a direction of flow within the catalyst bed during engine operation.

Embodiment 13

The system of any of Embodiments 8-12, further comprising a holding tank, the injector being in indirect fluid communication with the separator retentate outlet via the holding tank.

Embodiment 14

The system of any of Embodiments 8-13, wherein the membrane separator comprises a polymeric membrane, a zeolitic membrane, a porous carbon membrane, or a combination thereof.

Embodiment 15

The system or method of any of the above embodiments, wherein the second oxidation catalyst comprises 1.0 wt % to 15 wt % (or 2.0 wt % to 11.5 wt %) of Cu on a support comprising an MFI framework structure, a CHA framework structure, or a combination thereof, wherein the 1.0 wt % to 15 wt % (or 2.0 wt % to 11.5 wt %) of Cu is optionally deposited on the support by ion exchange.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for treating a combustion exhaust, comprising:
   separating a fuel comprising 5 vol % or more of ethanol into at least an ethanol-enriched fraction and a second fraction, the ethanol-enriched fraction comprising 40 vol % or more of ethanol;
   combusting at least one of the fuel and the second fraction in a combustion zone under lean combustion conditions to form a combustion exhaust comprising 50 vppm or more of $NO_x$;
   exposing, in the presence of a post-combustion-addition portion of the ethanol-enriched fraction, at least a portion of the combustion exhaust to a first catalyst to form a reduced exhaust fraction, the combined combustion exhaust and post-combustion-addition portion of the ethanol-enriched fraction comprising a ratio of ethanol to NO of 1:1 or more; and
   exposing at least a portion of the reduced exhaust fraction to a second catalyst to form a treated exhaust having an NO concentration of 50 wppm or less.

2. The method of claim 1, the method further comprising exposing at least a portion of the treated exhaust to a third catalyst comprising Pt, Pd, Rh, or a combination thereof on a refractory support, to form a treated, oxidized exhaust fraction, the third catalyst optionally comprising 0.1 wt % to 5.0 wt % of Pt, Pd, Rh, or a combination thereof relative to a weight of the catalyst.

3. The method of claim 1, further comprising returning at least a portion of the second fraction to a fuel reservoir comprising the fuel.

4. The method of claim 1, further comprising exposing at least a portion of the combustion exhaust to the first catalyst at a temperature below a threshold temperature, wherein the exposing in the presence of a post-combustion-addition portion of the ethanol-enriched fraction is started when the first catalyst is at a temperature greater than the threshold temperature.

5. The method of claim 4, wherein the threshold temperature is at least 100° C.

6. The method of claim 1, wherein separating a fuel comprises separating the fuel in the presence of a porous carbon membrane under osmosis conditions to form a retentate comprising the second fraction and a permeate comprising the ethanol-enriched fraction.

7. The method of claim 1, wherein separating a fuel comprises separating the fuel in the presence of a polymeric membrane, a zeolitic membrane, a porous carbon membrane, or a combination thereof.

8. The method of claim 1, wherein separating a fuel comprises separating the fuel in the presence of a membrane under pervaporation conditions to form a retentate comprising the second fraction and a permeate comprising the ethanol-enriched fraction.

9. The method of claim 1, wherein the second catalyst comprises 1.0 wt % to 15 wt % of Cu on a support comprising an MFI framework structure, a CHA framework structure, or a combination thereof.

10. The method of claim 9, wherein the 1.0 wt % to 15 wt % of Cu is deposited on the support by ion exchange.

11. The method of claim 1, further comprising a catalyst bed comprising the first catalyst and the second catalyst, wherein at least a portion of the catalyst bed is located in the exhaust conduit.

\* \* \* \* \*